United States Patent
Talwar et al.

(10) Patent No.: US 9,865,249 B2
(45) Date of Patent: Jan. 9, 2018

(54) REALTIME ASSESSMENT OF TTS QUALITY USING SINGLE ENDED AUDIO QUALITY MEASUREMENT

(71) Applicant: GM Global Technology Operations LLC, Detroit, MI (US)

(72) Inventors: Gaurav Talwar, Novi, MI (US); Scott M. Pennock, Lake Orion, MI (US); Timothy J. Grost, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/077,163

(22) Filed: Mar. 22, 2016

(65) Prior Publication Data
US 2017/0278506 A1  Sep. 28, 2017

(51) Int. Cl.
*G10L 13/00* (2006.01)
*G10L 13/033* (2013.01)
*G10L 15/14* (2006.01)

(52) U.S. Cl.
CPC .......... *G10L 13/033* (2013.01); *G10L 15/144* (2013.01)

(58) Field of Classification Search
CPC ..... G10L 25/69; H04M 3/2236; H04M 7/006; H04L 12/2697; H04L 43/50
USPC ........ 704/235, 244, 251, 254, 260, E15.002, 704/E15.005; 379/1.02; 370/352; 714/712, 776
See application file for complete search history.

(56) References Cited

U.S. PATENT DOCUMENTS

| | | | |
|---|---|---|---|
| 7,124,349 B2 * | 10/2006 | Barrett | H04L 1/0054 714/712 |
| 8,364,486 B2 * | 1/2013 | Basir | G10L 15/02 704/251 |
| 2006/0093094 A1 * | 5/2006 | Xing | H04M 3/2236 379/1.02 |
| 2010/0004931 A1 * | 1/2010 | Ma | G10L 15/08 704/244 |
| 2016/0379638 A1 * | 12/2016 | Basye | G06F 17/30764 704/235 |

\* cited by examiner

*Primary Examiner* — Charlotte M Baker
(74) *Attorney, Agent, or Firm* — Christopher DeVries; Reising Ethington P.C.

(57) ABSTRACT

A system and method of regulating speech output by a text-to-speech (TTS) system includes: evaluating speech that has been converted from text using an initial speech quality test before presentation to a user; applying a classification test to the evaluated speech if the evaluated speech falls below a threshold based on the initial speech quality test; generating an abnormal speech classification for the evaluated speech; and applying a corrective action to the evaluated speech based on the abnormal speech classification.

13 Claims, 6 Drawing Sheets

REALTIME ASSESSMENT OF TTS QUALITY USING SINGLE ENDED AUDIO QUALITY MEASUREMENT

TECHNICAL FIELD

The present invention relates to Text-to-Speech (TTS) systems and, more particularly, to assessing the output quality of TTS systems.

BACKGROUND

Users of text-based applications, such as those involving email and short message service (SMS), can visually review information and provide input based on the visual information. However, Text-to-Speech (TTS) systems are increasingly used to audibly provide the information that was once visually reviewed. As text is generated by these applications, it can be converted to speech that is then heard by the user. The user can then respond either verbally or using a peripheral device, such as a keyboard. The audible presentation of information can be used to implement more streamlined applications that can operate without certain hardware devices as well as be used in environments where distractions can be a problem, such as the use of displays in a vehicle.

However, successful use of TTS systems with text-based applications depends on a high-quality TTS system output. When users of the text-based applications can clearly understand the TTS system output, they are then more likely to successfully interact with the text-based applications successfully. And when the TTS system output is unclear, the users will struggle to successfully interact with the text-based application. When the TTS systems output speech, it would be helpful to assess the quality of speech before it is presented and change the output when the assessment indicates poor quality.

SUMMARY

According to an embodiment, there is provided a method of regulating speech output by a text-to-speech (TTS) system. The steps include evaluating speech that has been converted from text using an initial speech quality test before presentation to a user; applying a classification test to the evaluated speech if the evaluated speech falls below a threshold based on the initial speech quality test; generating an abnormal speech classification for the evaluated speech; and applying a corrective action to the evaluated speech based on the abnormal speech classification.

According to another embodiment, there is provided a method of regulating speech output by a text-to-speech (TTS) system. The steps include applying a plurality of Hidden Markov Models (HMMs) to speech converted from text before presentation to a user, wherein the HMMs have each been trained using training speech that includes a different type of speech deficiency; determining a confidence value for the speech using each of the plurality of HMMs; determining whether any of the confidence values indicate an abnormal speech classification; and applying a corrective action to the evaluated speech when the abnormal speech classification is present.

According to another embodiment, there is provided a method of regulating speech output by a text-to-speech (TTS) system. The steps include training a Hidden Markov Model (HMM) on speech converted from text before presentation to a user; comparing the HMM to a reference HMM that has been trained on human speech; determining the distance between the HMM trained on speech converted from text and the reference HMM; comparing the distance to a threshold; and applying a corrective action to the speech converted from text when the distance exceeds the threshold.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
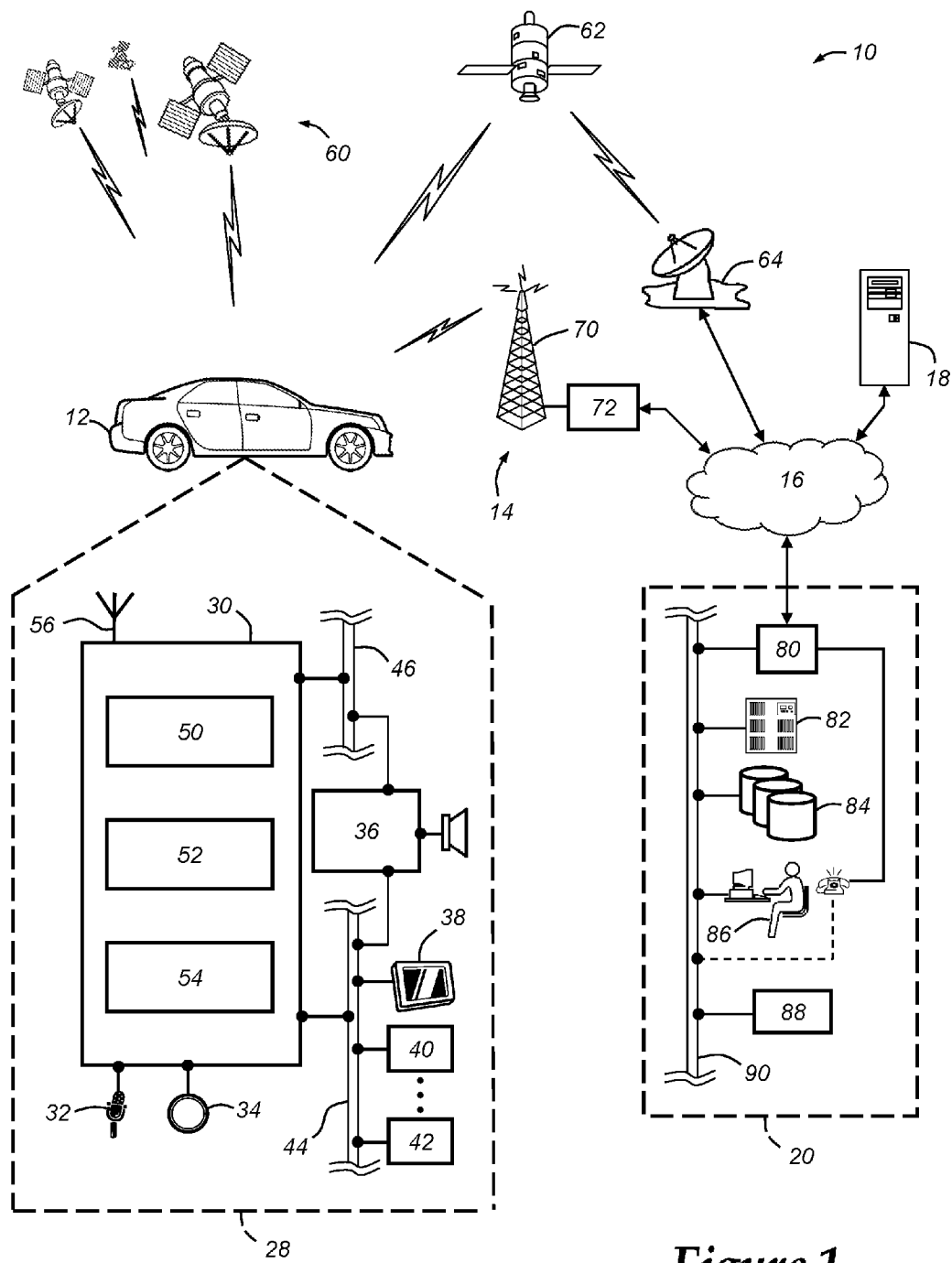
FIG. 1 is a block diagram depicting an embodiment of a communications system that is capable of utilizing the method disclosed herein.

The system and method described below initially assesses the quality of speech generated from text before it is presented audibly to a user and, if the quality is below a threshold, the speech can be further tested to obtain a classification that indicates what type of deficiency the generated speech suffers from. For example, the classification can indicate that the speech includes deficiencies such as improper pauses, poor diction or prosody, an abnormally fast presentation rate, or a lack of undulations/change in intonations. Once classified, the TTS system can alter its generated speech to remedy the deficiency before that speech is audibly presented to a user.

The speech generated from text can be analyzed before it is audibly presented to a user by applying a plurality of Hidden Markov Models (HMMs) that have each been trained to recognize a particular type of deficiency. Each HMM can be trained using training speech that includes a particular deficiency that the HMM can identify. When speech is generated from text, a confidence value, such as a predicted mean opinion score, can be calculated using each of the HMMs. The confidence values can indicate a correlation between speech generated from text (synthetic speech) and the HMM based on a comparison with a threshold or the values can be ranked to determine whether the speech generated from text includes one of the deficiencies. For example, when a confidence value generated by one of the HMMs rises above a predetermined threshold, the speech generated from text is significantly similar to the particular deficiency that HMM has been trained to recognize. Before the speech generated from text is then presented to a user, it can be modified to correct the identified deficiency.

A user's speech can also be used to monitor and improve the output from the TTS system. After received speech from a user of the TTS system, that speech can be modeled and the distance or differences can be determined between output from the TTS system and speech from the user. In some implementations, the TTS system can assess output from the TTS system using both the speech from the user and the HMM trained to recognize a particular type of speech deficiency. If the output from the TTS system strongly correlates with the user's speech and also does not correlate with any of the HMMs trained to recognize a particular deficiency, then the TTS system can play the output for the user. Otherwise, when the TTS output is not sufficiently similar to the user speech or is correlated to one or more of the HMMs trained to recognize a particular deficiency, then the TTS system can identify which impairment exists and alter the TTS output. For email and SMS message composition by speech, the user can listen to voice feedback to ensure veracity of the content. Therefore, the user could serve as a model for evaluating the quality of TTS-rendered synthetic speech.

When speech quality generated by the TTS system is poor, the functionality of text-based applications, such as those involving SMS and email, can be impaired. The length of time needed to complete these tasks rises while the number of tasks completed falls when generated speech is difficult to understand. Increasing the quality of generated speech by remedying deficiencies before presenting the speech to the user can help decrease the time used to complete tasks and increase the number of tasks a user completes.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
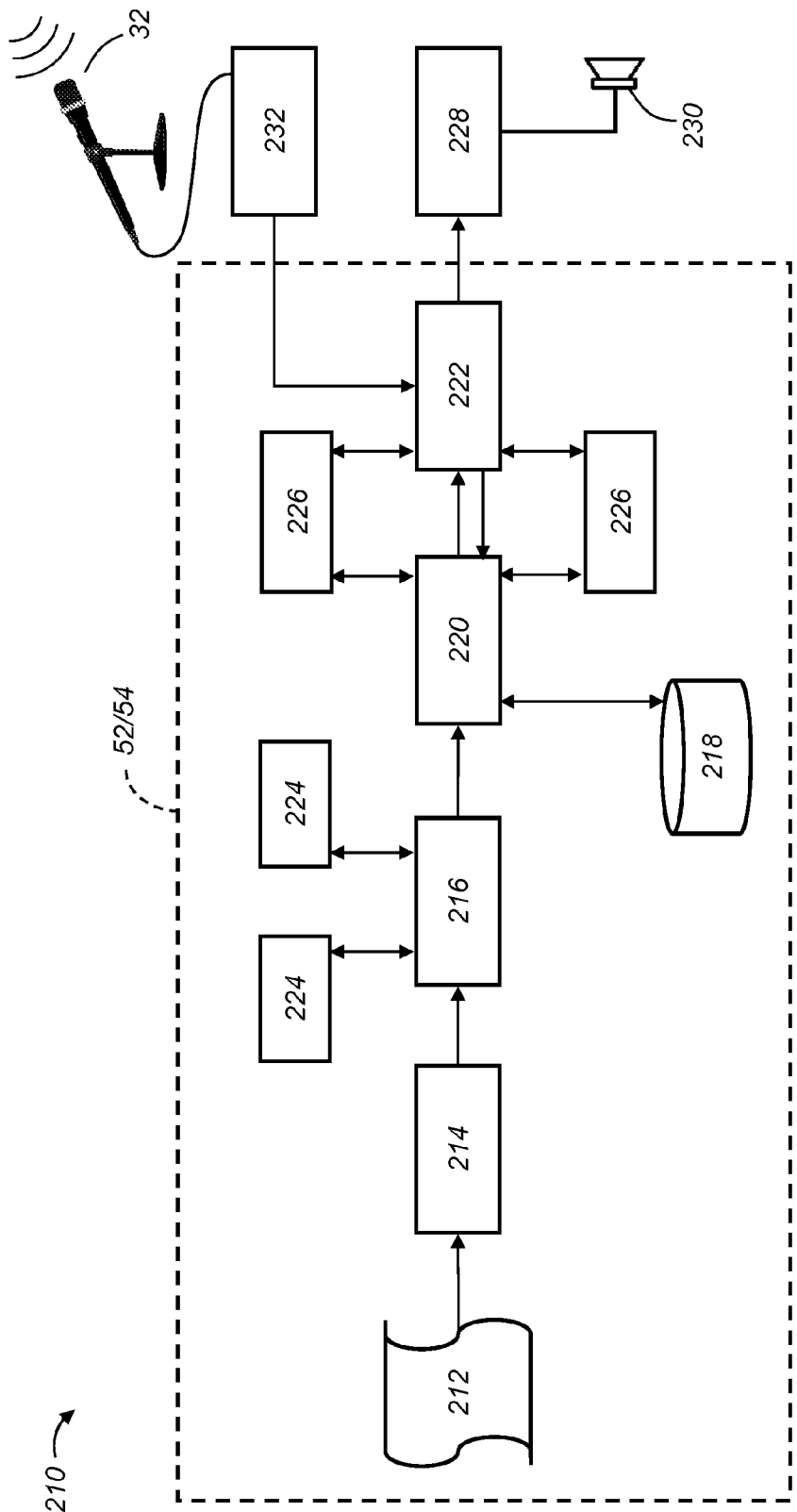
FIG. 2 is a block diagram depicting an embodiment of a TTS system that is capable of utilizing the method disclosed herein.

TTS systems are generally known to those skilled in the art, as described in the background section. But FIG. 2 illustrates an example of an improved TTS system according to the present disclosure. According to one embodiment, some or all of the system 210 can be resident on, and processed using, the telematics unit 30 of FIG. 1. According to an alternative illustrative embodiment, some or all of the TTS system 210 can be resident on, and processed using, computing equipment in a location remote from the vehicle 12, for example, the call center 20. For instance, linguistic models, acoustic models, and the like can be stored in memory of one of the servers 82 and/or databases 84 in the call center 20 and communicated to the vehicle telematics unit 30 for in-vehicle TTS processing. Similarly, TTS software can be processed using processors of one of the servers 82 in the call center 20. In other words, the TTS system 210 can be resident in the telematics unit 30 or distributed across the call center 20 and the vehicle 12 in any desired manner.

The system 210 can include one or more text sources 212, and a memory, for example the telematics memory 54, for storing text from the text source 212 and storing TTS software and data. The system 210 can also include a processor, for example the telematics processor 52, to process the text and function with the memory and in conjunction with the following system modules. A pre-processor 214 receives text from the text source 212 and converts the text into suitable words or the like. A synthesis engine 216 converts the output from the pre-processor 214 into appropriate language units like phrases, clauses, and/or sentences. One or more speech databases 218 store recorded speech. A unit selector 220 selects units of stored speech from the database 218 that best correspond to the output from the synthesis engine 216. A post-processor 222 modifies or adapts one or more of the selected units of stored speech. One or more or linguistic models 224 are used as input to the synthesis engine 216, and one or more acoustic models 226 are used as input to the unit selector 220. The system 210 also can include an acoustic interface 228 to convert the selected units of speech into audio signals and a loudspeaker 230, for example of the telematics audio system, to convert the audio signals to audible speech. The system 210 further can include a microphone, for example the telematics microphone 32, and an acoustic interface 232 to digitize speech into acoustic data for use as feedback to the post-processor 222.

The text source 212 can be in any suitable medium and can include any suitable content. For example, the text source 212 can be one or more scanned documents, text files or application data files, or any other suitable computer files, or the like. The text source 212 can include words, numbers, symbols, and/or punctuation to be synthesized into speech and for output to the text converter 214. Any suitable quantity and type of text sources can be used.

The pre-processor 214 converts the text from the text source 212 into words, identifiers, or the like. For example, where text is in numeric format, the pre-processor 214 can convert the numerals to corresponding words. In another example, where the text is punctuation, emphasized with caps or other special characters like umlauts to indicate appropriate stress and intonation, underlining, or bolding, the pre-processor 214 can convert same into output suitable for use by the synthesis engine 216 and/or unit selector 220.

The synthesis engine 216 receives the output from the text converter 214 and can arrange the output into language units that may include one or more sentences, clauses, phrases, words, subwords, and/or the like. The engine 216 may use the linguistic models 224 for assistance with coordination of most likely arrangements of the language units. The linguistic models 224 provide rules, syntax, and/or semantics in arranging the output from the text converter 214 into language units. The models 224 can also define a universe of language units the system 210 expects at any given time in any given TTS mode, and/or can provide rules, etc., governing which types of language units and/or prosody can logically follow other types of language units and/or prosody to form natural sounding speech. The language units can be comprised of phonetic equivalents, like strings of phonemes or the like, and can be in the form of phoneme HMM's.

The speech database 218 includes pre-recorded speech from one or more people. The speech can include pre-recorded sentences, clauses, phrases, words, subwords of pre-recorded words, and the like. The speech database 218 can also include data associated with the pre-recorded speech, for example, metadata to identify recorded speech segments for use by the unit selector 220. Any suitable type and quantity of speech databases can be used.

The unit selector 220 compares output from the synthesis engine 216 to stored speech data and selects stored speech that best corresponds to the synthesis engine output. The speech selected by the unit selector 220 can include pre-recorded sentences, clauses, phrases, words, subwords of pre-recorded words, and/or the like. The selector 220 may use the acoustic models 226 for assistance with comparison and selection of most likely or best corresponding candidates of stored speech. The acoustic models 226 may be used in conjunction with the selector 220 to compare and contrast data of the synthesis engine output and the stored speech data, assess the magnitude of the differences or similarities therebetween, and ultimately use decision logic to identify best matching stored speech data and output corresponding recorded speech.

In general, the best matching speech data is that which has a minimum dissimilarity to, or highest probability of being, the output of the synthesis engine 216 as determined by any of various techniques known to those skilled in the art. Such techniques can include dynamic time-warping classifiers, artificial intelligence techniques, neural networks, free phoneme recognizers, and/or probabilistic pattern matchers such as Hidden Markov Model (HMM) engines. HMM engines are known to those skilled in the art for producing multiple TTS model candidates or hypotheses. The hypotheses are considered in ultimately identifying and selecting that stored speech data which represents the most probable correct interpretation of the synthesis engine output via acoustic feature analysis of the speech. More specifically, an HMM engine generates statistical models in the form of an "N-best" list of language unit hypotheses ranked according to HMM-calculated confidence values or probabilities of an observed sequence of acoustic data given one or another language units, for example, by the application of Bayes' Theorem.

In one embodiment, output from the unit selector 220 can be passed directly to the acoustic interface 228 or through the post-processor 222 without post-processing. In another embodiment, the post-processor 222 may receive the output from the unit selector 220 for further processing.

In either case, the acoustic interface 228 converts digital audio data into analog audio signals. The interface 228 can be a digital to analog conversion device, circuitry, and/or software, or the like. The loudspeaker 230 is an electroacoustic transducer that converts the analog audio signals into speech audible to a user and receivable by the microphone 32.

The method or parts thereof can be implemented in a computer program product embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 3:
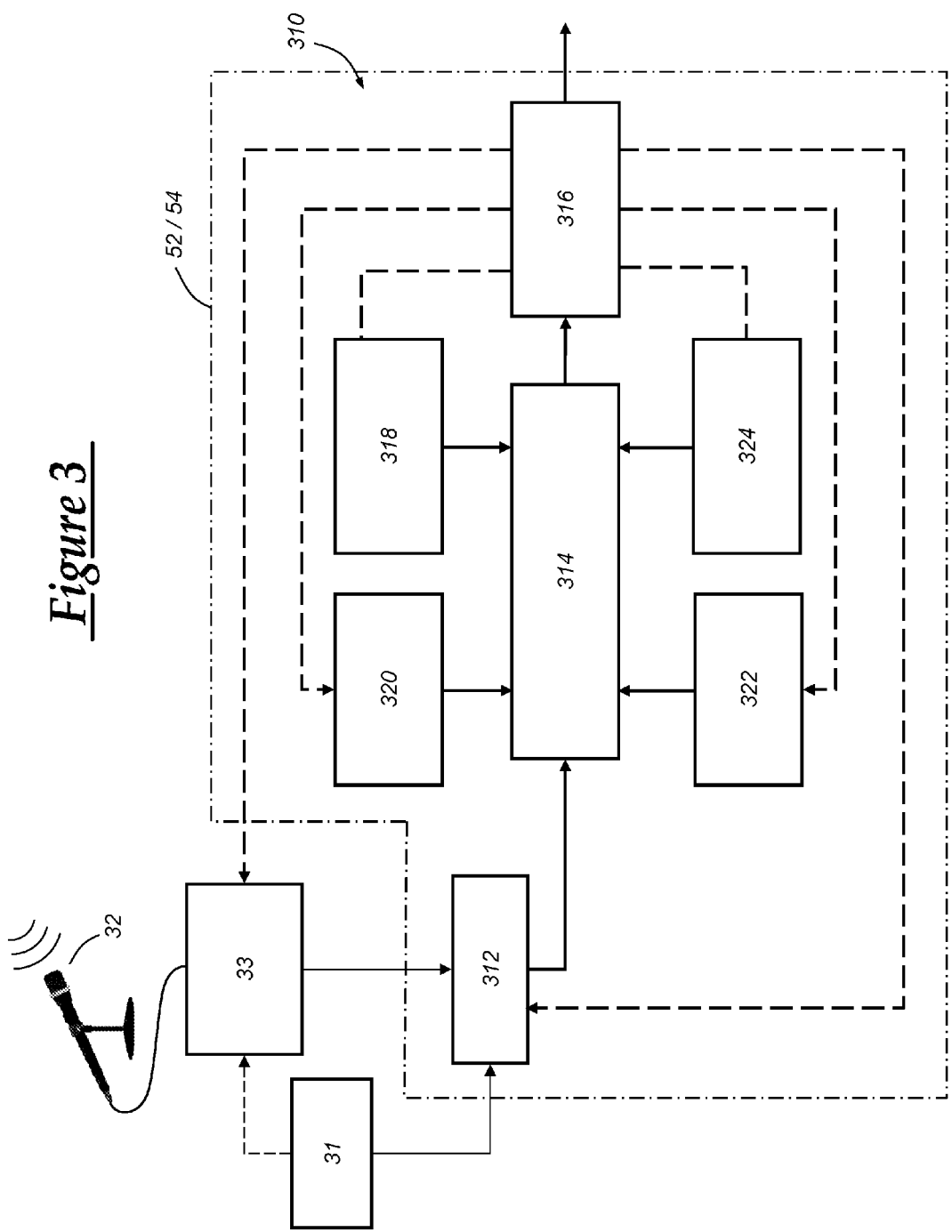
FIG. 3 is a block diagram depicting an embodiment of an automatic speech recognition (ASR) system that is capable of utilizing the method disclosed herein.

Turning now to FIG. 3, there is shown an exemplary architecture for an ASR system 310 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 3 illustrates just one specific exemplary ASR system 310. The system 310 includes a device to receive speech such as the telematics microphone 32, and an acoustic interface 33 such as a sound card of the telematics unit 30 having an analog to digital converter to digitize the speech into acoustic data. The system 310 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors, pre-processors, or pre-processor software modules 312 for parsing streams of the acoustic data of the speech into parametric representations such as acoustic features; one or more decoders or decoder software modules 314 for decoding the acoustic features to yield digital subword or word output data corresponding to the input speech utterances; and one or more back-end processors, post-processors, or post-processor software modules 316 for using the output data from the decoder module(s) 314 for any suitable purpose.

The system 310 can also receive speech from any other suitable audio source(s) 31, which can be directly communicated with the pre-processor software module(s) 312 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 314. First, grammar and/or lexicon model(s) 318 can provide rules governing which words can logically follow other words to form valid sentences. In a broad sense, a lexicon or grammar can define a universe of vocabulary the system 310 expects at any given time in any given ASR mode. For example, if the system 310 is in a training mode for training commands, then the lexicon or grammar model(s) 318 can include all commands known to and used by the system 310. In another example, if the system 310 is in a main menu mode, then the active lexicon or grammar model(s) 318 can include all main menu commands expected by the system 310 such as call, dial, exit, delete, directory, or the like. Second, acoustic model(s) 320 assist with selection of most likely subwords or words corresponding to input from the pre-processor module(s) 312. Third, word model(s) 322 and sentence/language model(s) 324 provide rules, syntax, and/or semantics in placing the selected subwords or words into word or sentence context. Also, the sentence/language model(s) 324 can define a universe of sentences the system 310 expects at any given time in any given ASR mode, and/or can provide rules, etc., governing which sentences can logically follow other sentences to form valid extended speech.

According to an alternative exemplary embodiment, some or all of the ASR system 310 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 310 can be resident in the telematics unit 30 or distributed across the call center 20 and the vehicle 12 in any desired manner, and/or resident at the call center 20.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage.

The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 312 transforms the continuous stream of digital speech data into discrete sequences of acoustic parameters. More specifically, the processor 52 executes the pre-processor module(s) 312 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 312 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 314 to process the incoming feature vectors of each test pattern. The decoder module(s) 314 is also known as a recognition engine or classifier, and uses stored known reference patterns of speech. Like the test patterns, the reference patterns are defined as a concatenation of related acoustic frames and corresponding parameters. The decoder module(s) 314 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 314 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 322 and to construct sentences with the input from the language models 324.

Finally, the post-processor software module(s) 316 receives the output data from the decoder module(s) 314 for any suitable purpose. In one example, the post-processor software module(s) 316 can identify or select one of the reference patterns from the N-best list of single or multiple word reference patterns as recognized speech. In another example, the post-processor module(s) 316 can be used to convert acoustic data into text or digits for use with other aspects of the ASR system or other vehicle systems. In a further example, the post-processor module(s) 316 can be used to provide training feedback to the decoder 314 or pre-processor 312. More specifically, the post-processor 316 can be used to train acoustic models for the decoder module(s) 314, or to train adaptation parameters for the pre-processor module(s) 312.

Method—

Figure 4:
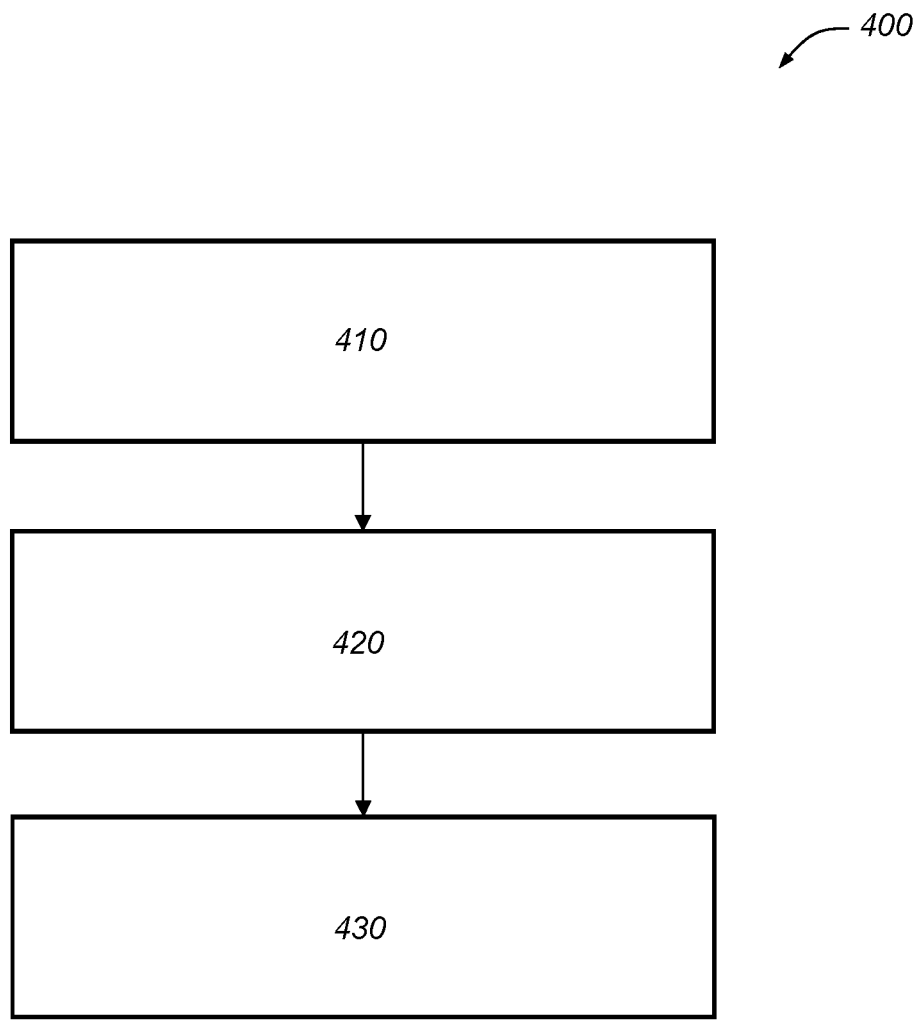
FIG. 4 is a flow chart depicting an embodiment of a method of regulating speech output by a TTS system.

Turning now to FIG. 4, there is shown a method (400) of regulating speech output by the TTS system 210. The method 400 begins at step 410 by evaluating speech that has been converted from text using an initial speech quality test before presentation to a user. The initial speech quality test can be implemented using single-ended speech quality estimation or assessment techniques that can analyze the quality of speech without access to the reference source speech signal. In one example of this, the single-ended speech quality estimation implemented by the International Telecommunication Union (ITU) P.563 algorithm can be used. The P.563 algorithm is known to those skilled in the art. Applying this test to speech converted from text can render a quality estimation value that indicates a relative objective assessment of speech quality. The quality estimation value can be a mean opinion score (MOS) ranking quality of speech from a low of 1 indicating poor speech quality to a high of 5 indicating very high quality speech, such that it nearly approximates human speech. If rendered speech falls below a MOS ranking of 4, the method 400 can conclude that the rendered speech is not sufficiently intelligible. The method 400 proceeds to step 420.

At step 420, a classification test is applied to the evaluated speech if the evaluated speech falls below a threshold based on the initial speech quality test. After determining that the speech quality is below a particular threshold, the TTS system 210 can then identify the particular type of deficiency the speech suffers from. The type of deficiency can be identified by a classification. The TTS system 210 can process the speech generated from text to generate an abnormal speech classification for the evaluated speech. The classification test can be implemented by a plurality of Hidden Markov Models (HMMs). Each of these HMMs can be dedicated to identifying a particular type of speech deficiency. Speech deficiencies can include improper pauses, poor diction or prosody, abnormally fast or slow presentation rates, or a lack of undulations or changes in intonation. And an HMM can be dedicated to detect each of these speech deficiencies. For example, one of the HMMs can be trained using training speech that includes improper pauses while another HMM can be trained using speech that lacks changes in intonation. These HMMs will then have each been trained using training speech that includes different classified impairments. The number of HMMs trained to detect a speech deficiency can vary depending on the number of speech deficiencies that the TTS system 210 is designed to detect. After training the HMMs individually on the training speech, they can be stored in the speech databases 218.

The HMMs can then be applied to the speech generated from text and confidence values for the speech can be determined using each of the plurality of HMMs. The confidence values for each of the HMMs can be compared against one or more thresholds. If a confidence value for a particular HMM is high, such as would occur when the value lies above a particular threshold, the speech can be determined to be highly correlated to the speech deficiency included in the training speech used to train that particular HMM. The confidence value can predict that the speech generated from text suffers from the same speech deficiency associated with the particular HMM. It is possible that the speech generated from text can be determined to suffer from more than one speech deficiency when the speech is determined to significantly correlate with more than one HMM. In that case, the speech can be determined to include more than one speech deficiency at the same time. The method 400 proceeds to step 430.

At step 430, a corrective action is applied to the evaluated speech based on the abnormal speech classification. When the confidence values indicate an abnormal speech classification, a corrective action can be applied to the evaluated speech when the abnormal speech classification is present. Depending on which speech deficiency is detected, the TTS system 210 can deploy one or more corrective measures to remedy the deficiency. For example, when one of the HMMs indicates that the speech is rendered too slow or too quickly, the TTS system 210 can direct the post-processor 222 to increase or decrease, respectively, the speed at which the speech is generated. Or in another example, the post-processor 222 can remove any extended pauses from generated speech in response to a determination that unneeded or lengthy pauses exist in the generated speech. The method 400 then ends.

Figure 5:
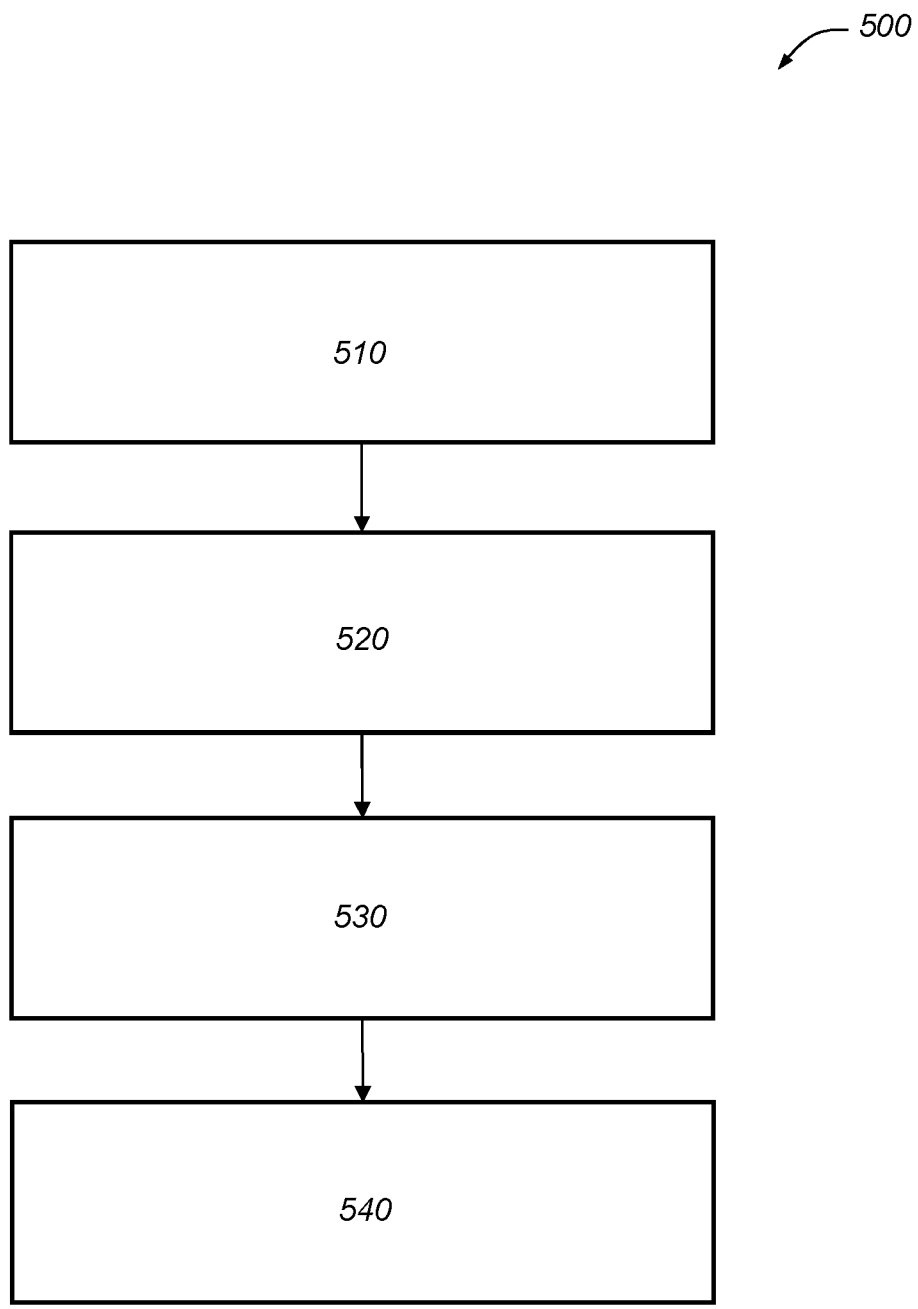
FIG. 5 is a flow chart depicting another embodiment of a method of regulating speech output by a TTS system.

Turning to FIG. 5, another embodiment of a method (500) of regulating the quality of speech output by the TTS system 210 is shown. The method 500 begins at step 510 by training an HMM on speech converted from text before presentation to a user. The TTS system 210 can generate and output speech that is used to train the HMM. The HMM can be used to observe the speech and provide a predictive representation of the synthesized speech generated by the TTS system 210. The method 500 proceeds to step 520.

At step 520, the HMM trained on speech converted from text is compared to a reference HMM that has previously been trained on human speech. The reference HMM can by trained using live human voices providing coherent, highly-understandable speech such that the HMM can represent a reference point to which the output from the TTS system 210 should mimic. The reference HMM can be trained using text dependent or text independent speech that is or is not gender dependent. After training, the reference HMM represents speech of relatively high quality. In subjective terms, the speech used to train the reference HMM may have been ranked by users with a rating of 4 or higher on a 1-5 range of the integer absolute category rating (ACR) system or MOS. The method 500 proceeds to step 530.

At step 530, a distance is determined between the HMM trained on speech converted from text and the reference HMM. This comparison can reveal how closely the speech generated by the TTS system 210 from text represents the ideal speech reflected by the reference HMM. For example, the Euclidean distance or probabilistic distance (Kullback-Leibler) between the MINI trained on speech converted from text and the reference HMM can be calculated. The closer distance-wise these HMM are to each other, the higher the quality of speech produced by the TTS system 210. The method 500 proceeds to step 540.

At step 540, the distance is compared to a threshold and a corrective action is applied to the speech converted from text when the distance exceeds the threshold. As the distance between the HMMs increase, the quality of the speech decreases. A threshold can be established for determining the existence of a particular threshold based on distance between the HMMs. The method 500 then ends.

Figure 6:
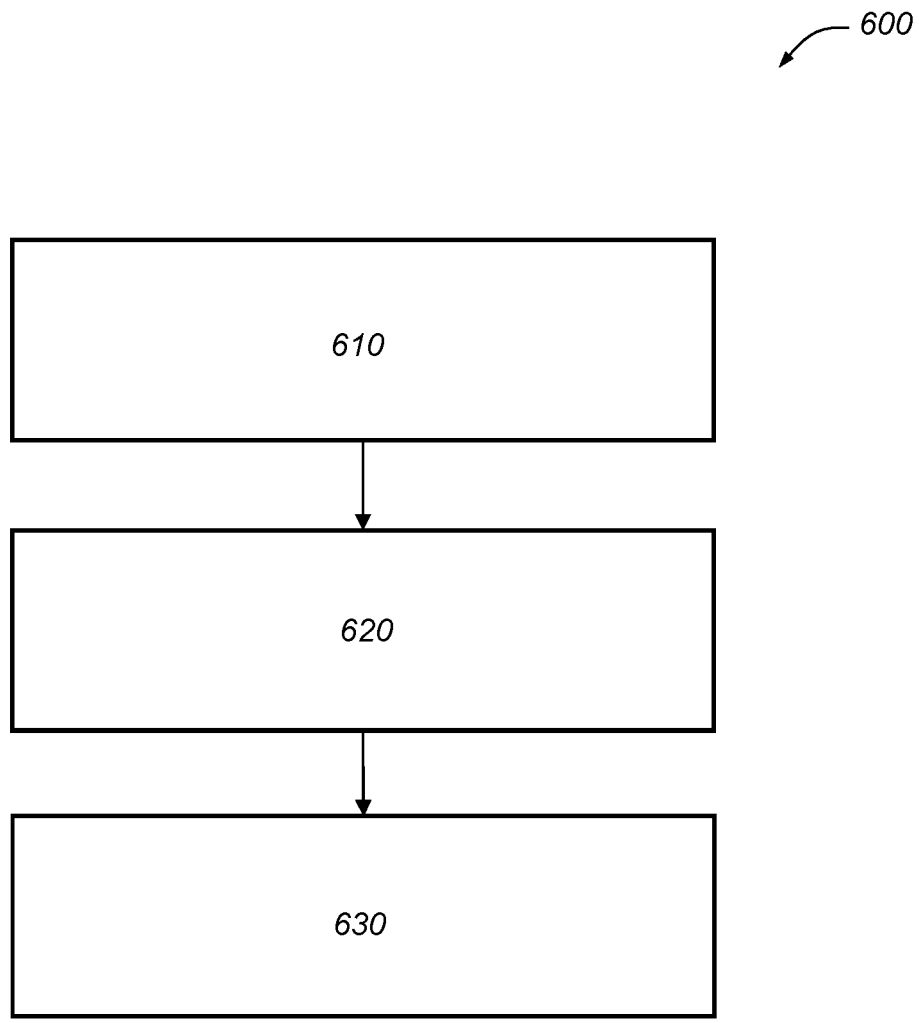
FIG. 6 is a flow chart depicting another embodiment of a method of regulating speech output by a TTS system.

FIG. 6 depicts another method 600 of regulating speech from the TTS system 210. The method 600 can be combined with one or more steps of method 400 to determine whether output from the TTS system 210 is clear. That is, TTS system output can be analyzed using both a user's voice and a single-ended speech quality test to determine whether or not TTS system output is clear. If the TTS system output is not clear after comparison with both the user's voice or the single-ended speech quality test, then TTS system output in the form of rendered speech can be analyzed using one or more of the HMMs trained for a particular speech deficiency. In addition, the ASR system 310 can process the output from the TTS system 210 to identify word confidence scores for each word included in the TTS system output. The TTS system 210 can then be directed to modify the TTS output based on the word confidence scores, the abnormal speech classification, or both. The word-level confidence provides essential cues to localize and identify the deficiencies more effectively for email and SMS dictation.

The method 600 begins at step 610 by receiving speech from a user. The microphone 32 can receive speech from a vehicle occupant that can be used as a basis for determining acceptable or clearly understood speech. The method 600 proceeds to step 620 and a model of the received speech is built. This model can be constructed by the TTS system 210 using any one of a number of modeling techniques known to those skilled in the art, such as HMMs or spectrograms. And then at step 630, the model of user speech can be compared to the output or synthesized speech generated by the TTS system 210. This comparison can be carried out as is described in step 530 above. The method 600 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of regulating speech output by a text-to-speech (TTS) system having an electronic processor and a database, comprising the steps of:
    (a) evaluating speech that has been converted from text using an initial speech quality test before presentation to a user;
    (b) applying a classification test to the evaluated speech when the evaluated speech falls below a threshold based on the initial speech quality test;
    (c) generating an abnormal speech classification for the evaluated speech; and (d) applying a corrective action to the evaluated speech based on the abnormal speech classification in step (c), wherein one or more of steps (a), (b), (c), and (d) are performed using the electronic processor, and at least some data relating to the initial speech quality test, the classification test, or the corrective action is stored in the database.

2. The method of claim 1, wherein the initial speech quality test is a non-intrusive speech quality assessment.

3. The method of claim 1, wherein the initial speech quality test is defined by the International Telecommunication Union (ITU) P.563 algorithm.

4. The method of claim 1, wherein the classification test comprises one or more Hidden Markov Models (HMMs) that are each trained using training speech including one abnormal speech type.

5. The method of claim 1, wherein the classification of evaluated speech includes an improper pause classification, an abnormal speaking rate classification, a poor enunciation classification, or an abnormal intonation classification.

6. The method of claim 1, further comprising the step of audibly presenting the corrected speech to the user.

7. The method of claim 1, further comprising the step of evaluating speech that has been converted from text using a speech model built from a user's voice.

8. A method of regulating the quality of speech output by a text-to-speech (TTS) system having an electronic processor and a database, comprising the steps of:
(a) applying a plurality of Hidden Markov Models (HMMs) to speech converted from text before presentation to a user, wherein the HMMs have each been trained using training speech that includes a different type of speech deficiency;
(b) determining a confidence value for the speech using each of the plurality of HMMs;
(c) generating a reference confidence value for the speech converted from text using an HMM trained using live reference speech;
(d) determining whether any of the confidence values determined in step (b) indicate an abnormal speech classification;
(e) calculating a distance between the reference confidence value determined in step (c) and the confidence values determined in step (b) using the HMMs trained on training speech that includes classified impairments;
(f) correlating the calculated distance with output from a speech quality test that is defined by the International Telecommunication Union (ITU) P.563 algorithm; and
(g) applying a corrective action to the evaluated speech when the abnormal speech classification is present, wherein one or more of steps (a), (b), (c), (d), (e), (f), and (g) are performed using the electronic processor, and at least some data relating to the HMMs, the speech quality test, or the corrective action is stored in the database.

9. The method of claim 8, wherein the abnormal speech classification includes an improper pause classification, an abnormal speaking rate classification, a poor enunciation classification, or an abnormal intonation classification.

10. A method of regulating the quality of speech output by a text-to-speech (TTS) system having an electronic processor and a database, comprising the steps of:
(a) training a Hidden Markov Model (HMM) on speech converted from text before presentation to a user;
(b) comparing the HMM to a reference HMM that has been trained on human speech;
(c) determining the distance between the HMM trained on speech converted from text and the reference HMM;
(d) comparing the distance to a threshold;
(e) correlating the distance between the HMM trained on speech converted from text and the reference HMM with an output from an initial speech quality test; and
(f) applying a corrective action to the speech converted from text when the distance exceeds the threshold, wherein one or more of steps (a), (b), (c), (d), (e), and (f) are performed using the electronic processor, and at least some data relating to the initial speech quality test, the classification test, or the corrective action is stored in the database.

11. The method of claim 10, wherein the reference HMM is trained on text-independent speech.

12. The method of claim 10, wherein the reference HMM is trained on gender-independent speech.

13. The method of claim 10, wherein the initial speech quality test is defined by the International Telecommunication Union (ITU) P.563 algorithm.

* * * * *